United States Patent

Lopata

[11] 4,027,832
[45] June 7, 1977

[54] LEADER-PIN

[76] Inventor: Ira Lopata, 35 Sutton Place, New York, N.Y. 10022

[22] Filed: Apr. 23, 1976

[21] Appl. No.: 679,691

[52] U.S. Cl. ............................ 242/197; 360/95
[51] Int. Cl.² .................. G03B 1/04; G11B 15/32; G11B 23/04
[58] Field of Search ........... 242/60, 74, 195–200; 206/398, 400, 387; 352/72–78 R; 360/93, 95, 132, 85

[56] References Cited

UNITED STATES PATENTS

| | | | |
|---|---|---|---|
| 1,322,966 | 11/1919 | Sinclair | 206/400 |
| 1,649,470 | 11/1927 | Hayden | 242/74 |
| 1,977,103 | 10/1934 | Wise | 242/60 |
| 3,188,091 | 6/1965 | Goodell | 242/195 |
| 3,594,512 | 7/1971 | Castagna | 360/95 |

*Primary Examiner*—Leonard D. Christian
*Attorney, Agent, or Firm*—Norman N. Popper

[57] ABSTRACT

A leader-pin to securely hold the leader of a film strip or magnetic tape for high speed unwinding and rewinding wherein the end of the film strip or magnetic tape is inserted between a split rod and the split rod is then inserted into an elongated, resilient tube, with the end of the strip protruding from an elongated slit in the tube; the tube frictionally engaging the strip and the rod, so that the strip will not slip out of the leader-pin.

1 Claim, 4 Drawing Figures

LEADER-PIN

BACKGROUND OF INVENTION

1. Field of Invention

This invention relates generally to leader pins for attachment to the end of a film strip, a magnetic tape, or the like, and particularly to such devices wherein a bifurcated rod receives the leader of the strip or tape and is inserted into an elongated tube, with the strip, tape or leader issuing from an elongated slit in the tube.

2. Prior Art

In various systems involving the withdrawing of films from cassettes, and magnetic tape from cassettes or reels as well, where the strip has to be picked up automatically, a bar is attached to the end of the strip, by wrapping the strip around the bar and cementing it on. Another means for attaching a strip has been the preparation of a tube with a spur mounted thereon, upon which spur the end of the strip is impaled. Such devices have not been found satisfactory for high speed unwinding of tapes and film strips, because they may not firmly grip the strip, or tear it, or because the cementing operation requires time and skill, and additional time for the cement to set.

SUMMARY OF INVENTION

It has been found that a leader-pin can be provided which is easily and swiftly attachable to the end of a film, or tape or to a leader secured thereto. This leader-pin firmly seizes the end of the strip, and holds it securely during high speed unwinding operations. The leader-pin may be readily held at the mouth of a cassette, and is easily picked up by an unreeling or unwinding apparatus for automatically seeking a preselected recorded or pictured piece of information on the strip. This invention involves a split pin between the portions of which, the strip is inserted. The split pin is then inserted into a tube having a longitudinal slot through which the strip protrudes. The tube is resilient and firmly holds the rod and the strip. The leader-pin can be mounted in a few seconds on the end of a strip. Even the most unskilled will have no problem in inserting the rod into the tube with the strip in registration with the longitudinal slit, thereby providing a firmly attached leader-pin for the strip.

THE DRAWINGS

These objects and other objects and advantages may be attained by the device shown by way of illustration in the drawings in which.

DEFINITIONS

Figure 1:
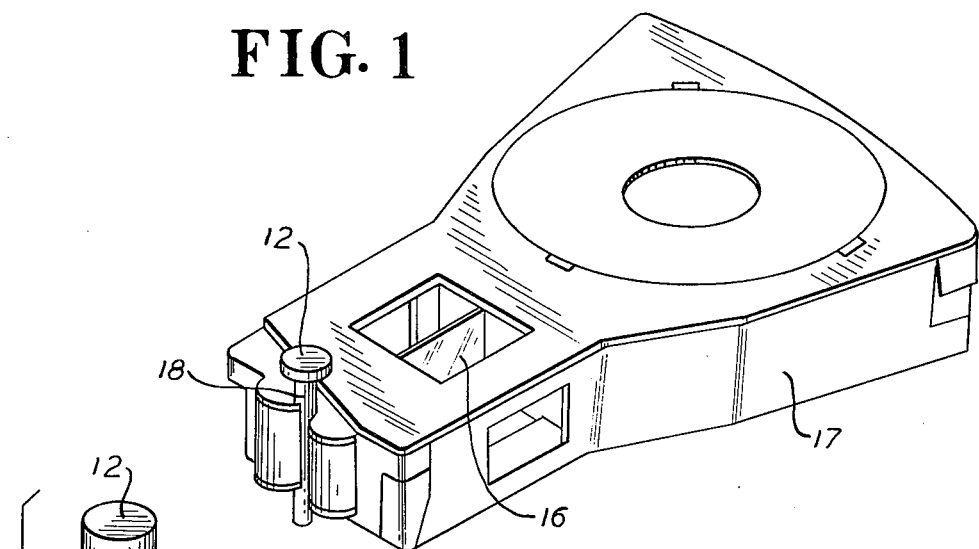
FIG. 1 is a perspective view of a cassette with the leader-pin at the film strip discharge point.

Strip as used herein means a photofilm or a magnetic tape, and includes such strips with or without a leader.

Leader as used herein means a strip attached to the end of a photofilm, or magnetic tape, or the leading end portion of a photofilm or magnetic tape without an attached end portion.

PREFERRED EMBODIMENT

Referring now to the drawings in detail, the leader-pin provides a rod 11 which is provided with an enlargement or knob 12 at one end. The knob 12 may be of any shape to permit convenient handling, but is preferrably cylindrical and knurled. The other end of the rod is bifurcated; the bifurcated portions 13, 14 are semi-circular, as the rod has a generally circular cross-section area. One 15 of the bifurcated portions 13, 14 is shorter than the other to enable the convenient insertion of a strip in between them. The leader-pin may be used to enable the unspooling of photographic film strips 16 from a cassette 17 (U.S. Pat. No. 3,804,498). The leader-pin provides a firm grip on the end of the film, so that it may be unreeled or wound-up with considerable force at a high rate of speed, and subject to rapid changes of speed under braking action, wherein a particular frame is sought. The leader-pin may likewise be used in connection with magnetic tapes to enable the end, just like the film strip, to be picked up and unreeled, to a selected portion where desired information is magnetically recorded. The rod 11 may be made of many different materials such as metal, or plastic.

An elongated tube 18 is provided. It is preferably cylindrical in shape, of a size to closely embrace the rod 11. It may be somewhat resilient, so that it will yield to the rod 11 when it expands by reason of a strip 16 being inserted between the portions 13, 14 and will resiliently seize and frictionally hold the rod 11 and grip it firmly. The tube 18 may be made of plastic material, or of spring steel, or the like. The tube 18 is provided with a longitudinal slit 20.

Figure 2:
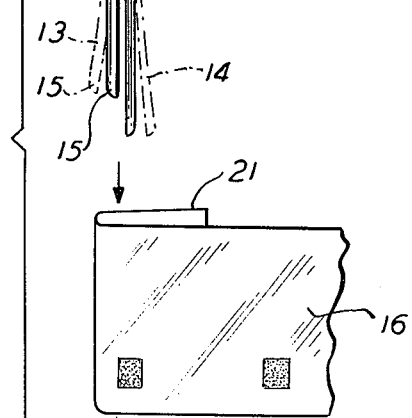
FIG. 2 is an exploded view of the tube, strip and rod in position for formation into a leader-pin.
Figure 3:
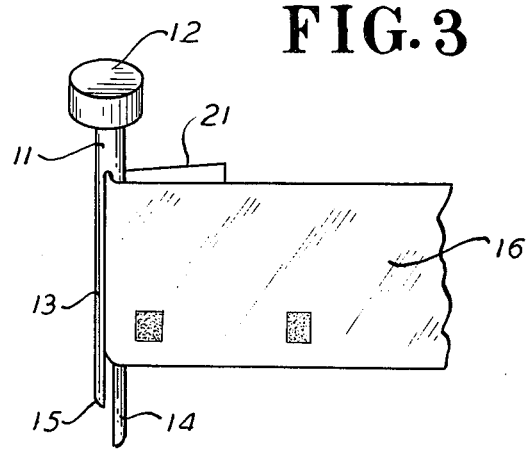
FIG. 3 is a view of the bifurcated rod embracing a film strip.
Figure 4:
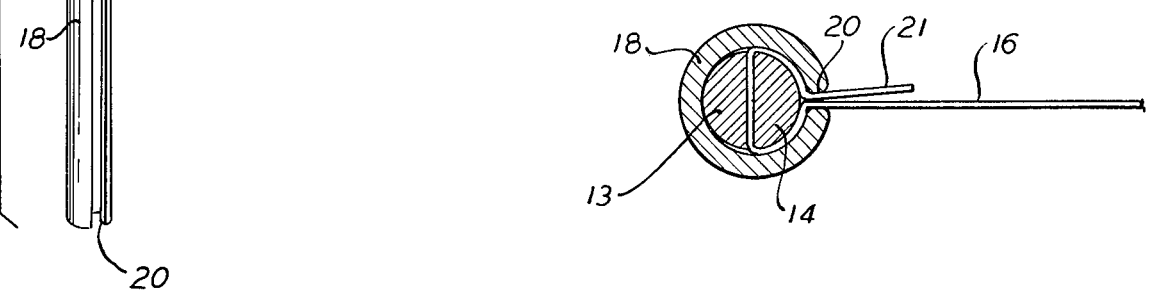
FIG. 4 is a cross-sectional view of the leader-pin assembled with a strip held therein.

The strip 16, protruding from the cassette 17 is inserted between the bifurcated portions 13, 14 of the rod 11, as shown in FIG. 3. The rod 11 is then inserted into the tube 18 as generally indicated in FIG. 2 with the strip 16 extending through the slit 20 as shown in FIG. 4. The strip 16 is firmly seized between the bifurcated portions 13, 14. The strip may then be wound up into the cassette 17, until the leader-pin is firmly seated at the end of the cassette 17. In this position, the leader-pin may be picked up to enable the strip 16 to be unreeled at high speed without the danger of the leader-pin disengaging under high speed winding, or rapid braking to a standstill at a selected frame or portion, or during high speed unwinding, or braking such reversal. Developed films or tapes provided by a developer or recorder, may be firmly secured to a leader-pin without any special skill or processing to accomplish attachment. The cassette 17 is then ready to be incorporated in a data recapture system.

As shown in FIG. 4, the tail end 21 of the strip 16 extends through the slit 20 for a short distance; this enhances the tight grip of the tube 18 on the strip 16.

What is claimed:

1. A combination leader-pin and tape cartridge comprising,
   a. a rod,
   b. a knob on the end of the rod,
   c. the other end of the rod being bifurcated, to receive an elongated strip therebetween,
   d. an elongated tube dimensioned to receive the rod by coaxial movement over the one end toward the knob, and having a longitudinal slit in the tube to accomodate the extension of a strip therefrom as the tube is applied to the rod,
   e. a strip passed through the bifurcated end of the rod, and extending out of the slit in the tube,
   f. a cassette,
   g. the remainder of the elongated strip in the cassette,
   h. the rod seated externally at the end of the cassette when the strip is wound up into the cassette.

* * * * *